(12) United States Patent
Tanaka et al.

(10) Patent No.: US 7,375,450 B2
(45) Date of Patent: May 20, 2008

(54) HUB UNIT FOR USE IN ELECTRICALLY MOVABLE WHEELS AND VEHICLE COMPRISING THE HUB UNIT

(75) Inventors: Tatsuaki Tanaka, Kasai (JP); Kazuhiro Tomoshige, Kasai (JP); Ryohei Adachi, Hyogo (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/137,236

(22) Filed: May 25, 2005

(65) Prior Publication Data

US 2005/0264111 A1    Dec. 1, 2005

(30) Foreign Application Priority Data

May 27, 2004    (JP)    ............... 2004-156966

(51) Int. Cl.
  *H02K 1/18*    (2006.01)
  *H02K 1/22*    (2006.01)
  *H02K 1/28*    (2006.01)
  *H02K 7/00*    (2006.01)

(52) U.S. Cl. ..................... 310/217; 310/75 C (58) Field of Classification Search ............... 180/65.5, 180/65.6, 65.1; 310/83, 75 R, 217, 216, 310/67 A, 75 C, 67 R, 89, 254, 258, 259, 310/100

See application file for complete search history.

(56) References Cited

U.S. PATENT DOCUMENTS

| | | | | |
|---|---|---|---|---|
| 2,653,208 A | * | 9/1953 | Ballman | 219/150 V |
| 2,818,515 A | * | 12/1957 | Dolenc | 310/57 |
| 4,102,040 A | * | 7/1978 | Rich | 29/598 |
| 4,295,268 A | * | 10/1981 | Punshon et al. | 29/596 |
| 4,626,725 A | * | 12/1986 | Kawada et al. | 310/89 |
| 4,745,314 A | * | 5/1988 | Nakano | 310/57 |
| 4,912,350 A | * | 3/1990 | Parshall et al. | 310/217 |
| 5,767,598 A | * | 6/1998 | Kano et al. | 310/91 |
| 5,920,139 A |   | 7/1999 | Fujiwara et al. | |
| 6,225,724 B1 | * | 5/2001 | Toide et al. | 310/216 |
| 6,276,475 B1 | * | 8/2001 | Nakanosono | 180/65.8 |
| 6,335,583 B1 | * | 1/2002 | Kusase et al. | 310/254 |
| 6,346,758 B1 | * | 2/2002 | Nakamura | 310/217 |
| 6,993,822 B2 | * | 2/2006 | Park et al. | 29/596 |
| 7,002,277 B2 | * | 2/2006 | Yamamoto et al. | 310/216 |
| 7,170,209 B2 | * | 1/2007 | Araki et al. | 310/156.47 |

(Continued)

FOREIGN PATENT DOCUMENTS

EP    0 949 742 A1    10/1999

(Continued)

*Primary Examiner*—Tran Nguyen
(74) *Attorney, Agent, or Firm*—Philip E. Levy; Arnold B. Silverman; Eckert Seamans Cherin & Mellott, LLC (57) ABSTRACT

A hub unit for use in electrically assisted bicycles has an improved effect to radiate heat from a stator. A hub (7) has inner teeth (66*a*) meshable with planetary gears (65) and a fixing support shaft (57) projecting from opposite ends of the hub and provided fixedly relative to a motor housing (5). The motor housing (5) has no cylindrical wall (8) covering the outer peripheral surface of the stator (3) but leaves the stator outer peripheral surface exposed to effectively release the heat generated by the windings of the stator.

4 Claims, 9 Drawing Sheets

U.S. PATENT DOCUMENTS

| | | | |
|---|---|---|---|
| 2002/0163258 A1* | 11/2002 | Lynch | 310/58 |
| 2005/0258704 A1* | 11/2005 | Oohashi et al. | 310/216 |
| 2005/0264111 A1* | 12/2005 | Tanaka et al. | 310/75 C |
| 2005/0264112 A1* | 12/2005 | Tanaka et al. | 310/75 C |

FOREIGN PATENT DOCUMENTS

| | | | | |
|---|---|---|---|---|
| EP | 1 233 500 A1 | | 8/2002 | |
| FR | 1 517 088 | | 3/1968 | |
| GB | 2303745 A | * | 2/1997 | |
| JP | 2001-057748 | * | 2/2001 | 310/217 |
| JP | 2001-211574 | * | 8/2001 | 310/216 |
| JP | 2001341688 A | * | 12/2001 | |
| JP | 2003 164110 A | | 6/2003 | |
| JP | 2005218194 A | * | 8/2005 | |

* cited by examiner

HUB UNIT FOR USE IN ELECTRICALLY MOVABLE WHEELS AND VEHICLE COMPRISING THE HUB UNIT

FIELD OF THE INVENTION

The present invention relates to hub units for use in electrically movable wheels, and to electrically assisted bicycles, wheelchairs and like vehicles comprising the hub unit.

BACKGROUND OF THE INVENTION

Figure 9:
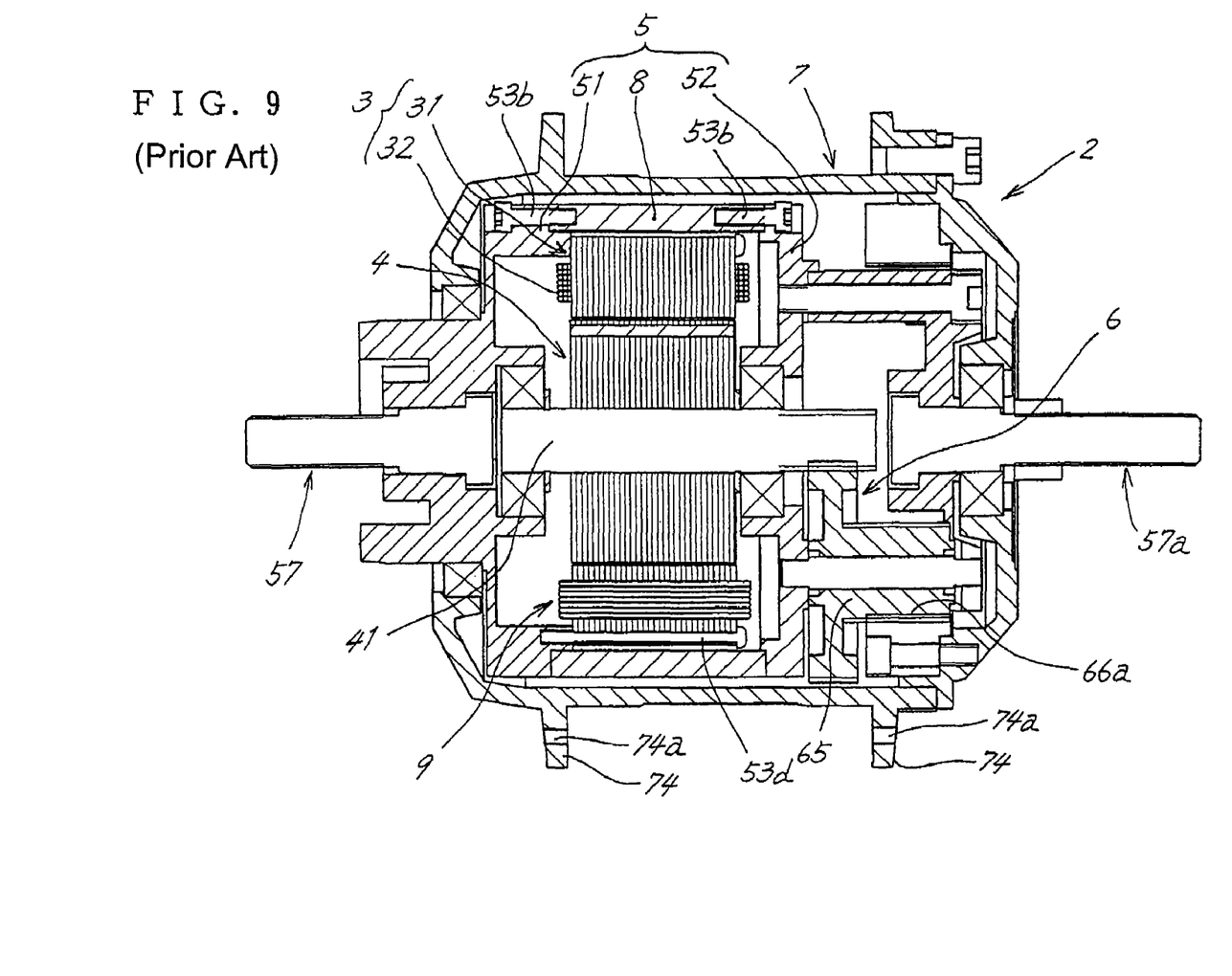
FIG. 9 is a sectional view of a conventional hub unit.
Figure 10:
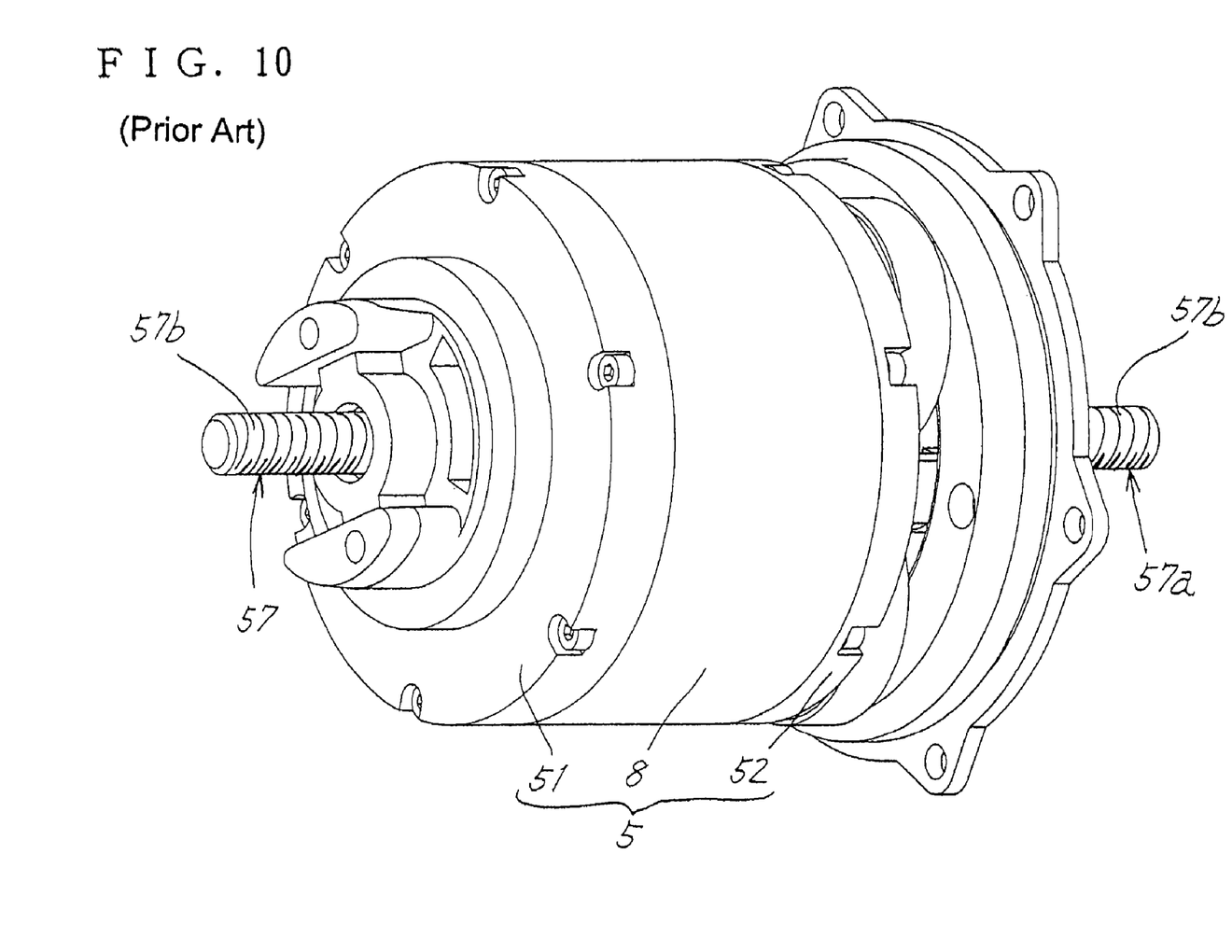
FIG. 10 is a perspective view of the hub unit with a hub main body removed.

FIG. 9 shows an electrically movable wheel hub unit 2 for an electrically assisted bicycle.

The electrically movable wheel hub unit (hereinafter referred to as the "hub unit") has a motor 9 comprising a stator 3 and a rotor 4, a hub 7 enclosing the motor 9 therein and rotatingly drivable at a reduced speed by the motor 9 and a planetary gear reduction mechanism 6, and fixing support shafts 57, 57a disposed on the axis of rotation of the hub 7 fixedly relative to a motor housing 5 and projecting outward from the hub 7.

The stator 3 comprises a stack 31 of metal plates and windings 32 provided on the metal plate stack 3.

The motor housing 5 comprises a cylindrical wall 8 and a pair of end plates 51, 52 closing opposite end openings of the wall 8. The end plates 51, 52 are fastened to the cylindrical wall 8 with bolts 53b, 53b.

The metal plate stack 31 of the stator 3 is fastened to one of the end plates, 51, with a plurality of bolts 53d extending through the outer peripheral portion of the stack.

The fixing support shafts 57, 57a extending through respective opposite ends of the hub 7 are fixed to the front or rear fork of the bicycle, and the spokes (not shown) of the wheel are fitted into spoke attaching holes 74a in circumferential walls 74, 74 provided around the outer periphery of the hub 7.

When windings 32 of the stator 3 are energized, the rotor 4 rotates. The rotation of the rotor 4 is transmitted to the hub 7 upon a speed reduction by the planetary gear reduction mechanism 6 to rotate the wheel of the bicycle.

In the case where a load not smaller than a specified value acts on the pedals of the bicycle when they are stepped on, the windings 32 of the stator 3 are energized, permitting the rider to run with ease even on slopes.

See, for example, JP-A No. 2002-514550.

The energization of the windings results in heat generation.

If the windings 32 are overheated, the rotor 4 can not be rotated with high torque, hence a need for a contrivance for releasing the heat of the windings 32.

However, since the stator 3 is enclosed in the motor housing 5 which is closed, the stator 3 is unable to radiate heat effectively.

For this reason, it is practice to enclose a cooling liquid within the hub 7 to cool the motor housing 5 from outside and suppress the heat generation of the windings 32.

When the cooling liquid is enclosed in the hub 7, means or measure is needed for preventing leakage of the liquid to result in a corresponding increase in cost. The cooling liquid used correspondingly increases the weight of the hub unit.

The present invention provides a hub unit of the type described wherein the outer peripheral surface of the stator 3 is left exposed to face the inner surface of the hub 7, with the cylindrical wall 8, part of the motor housing 5, dispensed with so as to cause the stator 3 to release heat more effectively for the prevention of overheating. The invention also provides a vehicle comprising the hub unit.

SUMMARY OF THE INVENTION

The present invention provides a hub unit 2 comprising a motor 9 composed of a stator 3 and a rotor 4, a hub 7 enclosing the motor therein and rotatingly drivable by the rotation of the rotor 4, and a fixing support shaft 57 disposed on an axis of rotation of the hub 7 and projecting from the motor housing 5 fixedly relative thereto, the support shaft 57 projecting outward beyond the hub 7.

The motor housing 5 comprises a pair of end plates 51, 52 opposed to each other, with a stack 31 of metal plates of the stator 3 held therebetween, and fastened to each other by tightening up bolts to cause the end plates 51, 52 to clamp the metal plate stack 31 therebetween.

The stator 3 has an outer peripheral surface left exposed to face an inner surface of the hub 7 between the end plates 51, 52.

The motor housing 5 has no cylindrical wall 8 surrounding the outer peripheral surface of the metal plate stack 31 of the stator 3, so that even in the event of the windings of the stator 3 generating heat, the heat can be effectively released through the stator 3 to the outside of the motor housing 5, consequently preventing the windings 32 from overheating.

This obviates the need to suppress the overheating of the windings 32 by the conventional means, i.e., a cooling liquid enclosed within the hub 7.

Because the cylindrical wall 8 of the motor housing 5 can be dispensed with and further because there is no need for time and labor for enclosing the cooling liquid in the hub, the hub unit can be manufactured at a reduced cost. The hub unit can be obtained also with a weight reduction corresponding to the cylindrical wall 8 and the cooling liquid omitted.

The stator 3 can be given an increased outside diameter corresponding to the absence of the cylindrical wall 8, with the result that increased torque is available.

DESCRIPTION OF THE PREFERRED EMBODIMENTS

Figure 1:
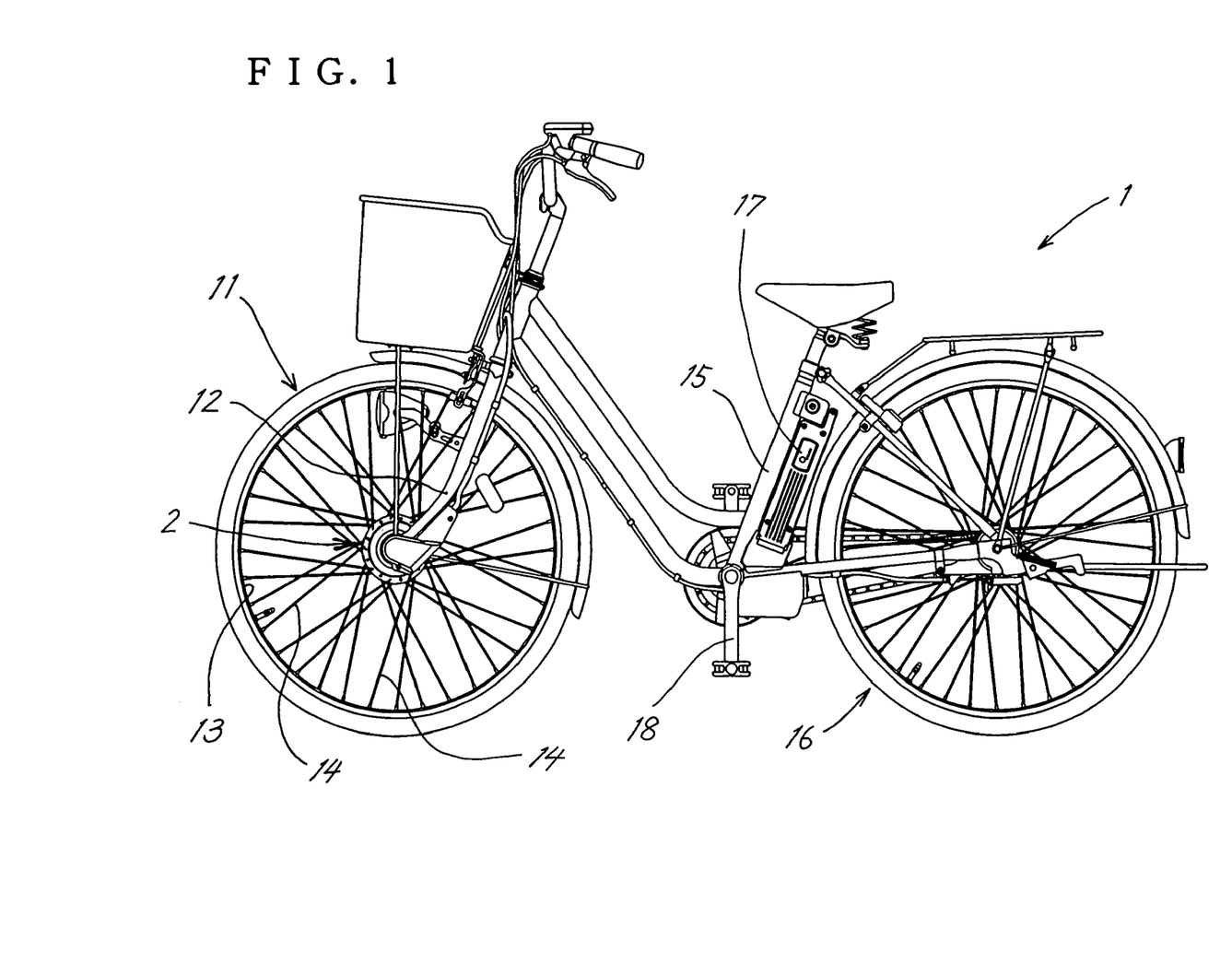
FIG. 1 is a front view of an electrically assisted bicycle.

FIG. 1 shows an example of electrically assisted bicycle 1 having a hub unit 2 of the present invention.

A hub unit 2 is attached to the lower end of a front fork 12 of the bicycle 1, and the hub unit 2 and the rim 13 of a front wheel 11 are interconnected by spokes 14, 14.

A battery 17 is mounted on the bicycle between a seat post 15 and a rear wheel 16.

A sensor (not shown) is provided on a suitable portion on which the pedaling force of the pedals 18 acts for energizing a motor 9 of the hub unit 2 by the battery 17 when the load on the pedals is not smaller than a predetermined value.

Figure 2:
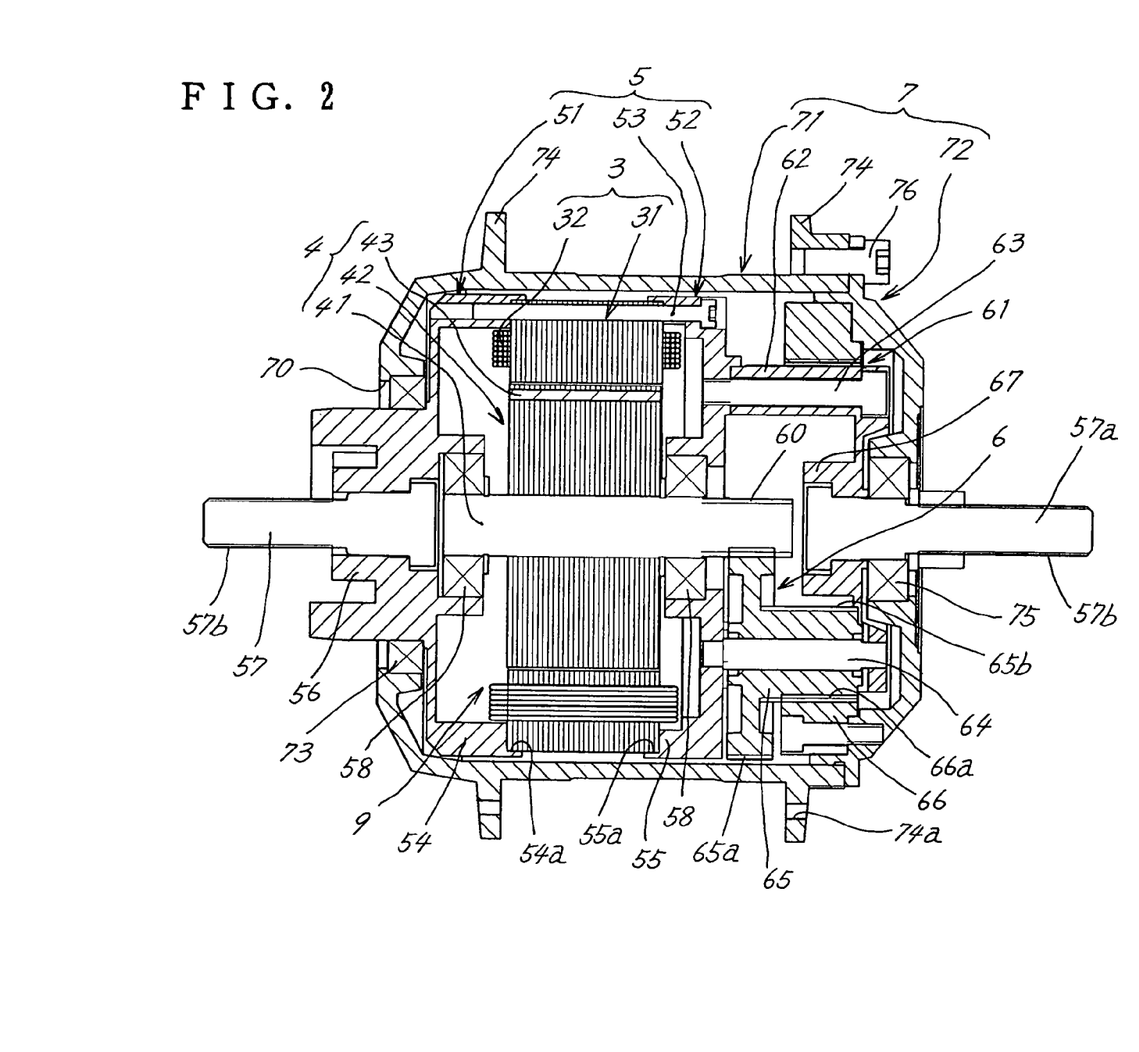
FIG. 2 is a sectional view of a hub unit.
Figure 3:
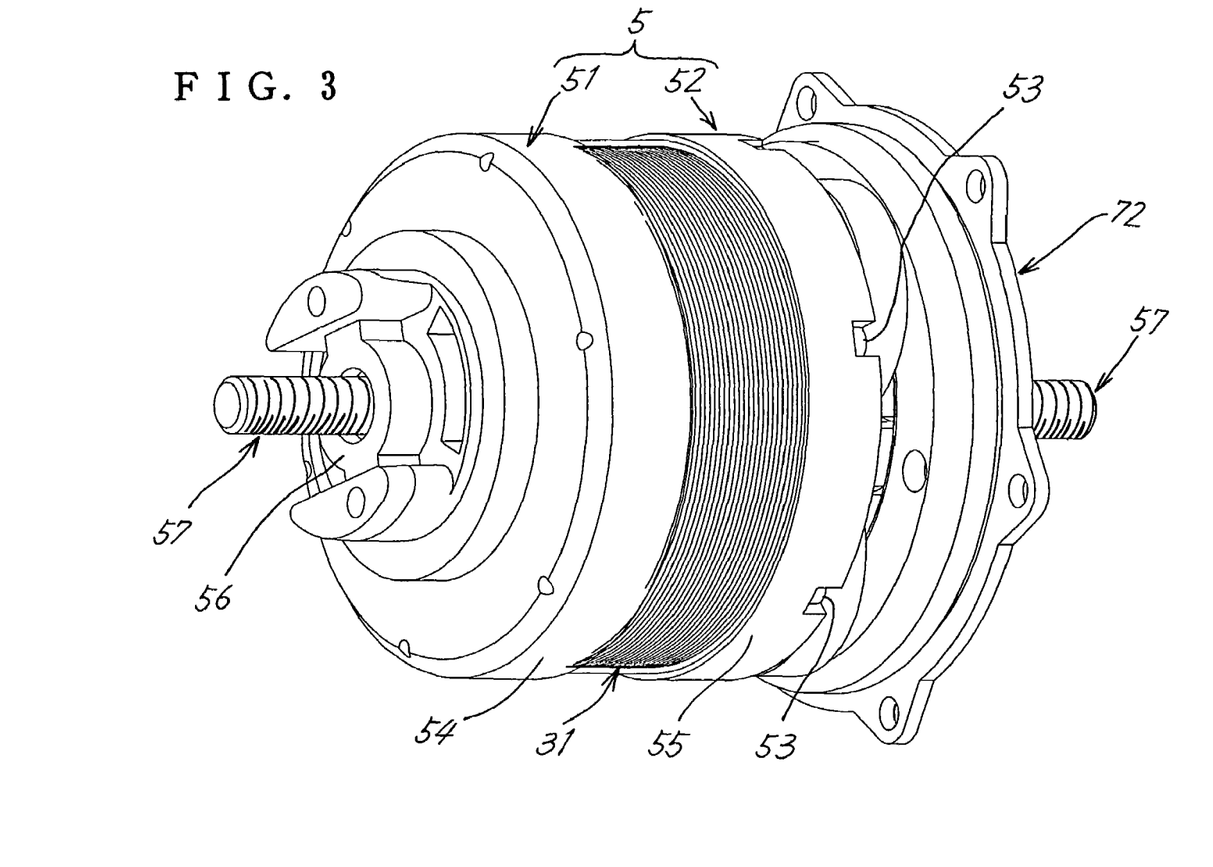
FIG. 3 is a perspective view of the hub unit with a hub main body removed.
Figure 4:
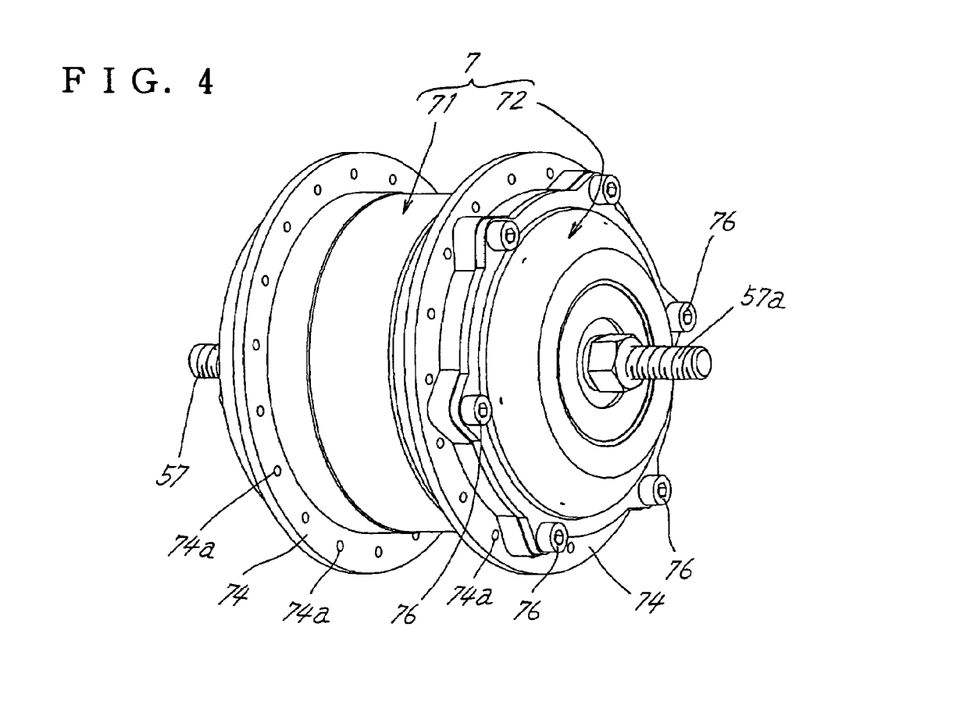
FIG. 4 is a perspective view of the hub unit.

The hub unit 2, which basically has the same construction as the conventional example of FIG. 9, has the above-mentioned motor 9 which comprises a stator 3 and a rotor 4, a hub 7 enclosing the motor 9 therein and rotatingly driven by the rotation of the rotor 4, and a fixing support shaft 57 secured to a motor housing 5, projecting therefrom in alignment with the axis of rotation of the hub 7 and extending outward from the hub 7.

Figure 5:
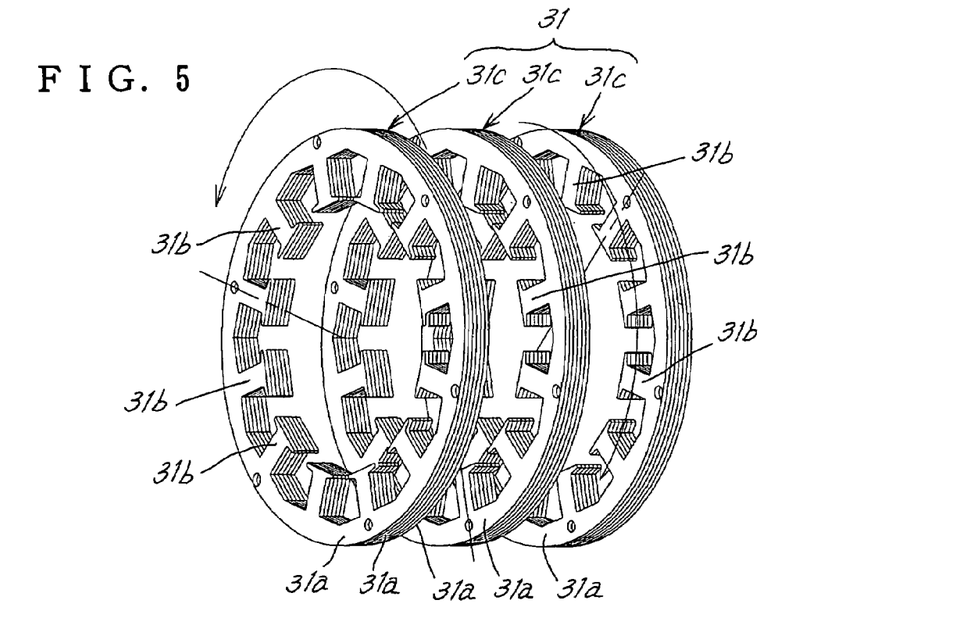
FIG. 5 is an exploded perspective view of a stack of metal plates.

The stator 3 has a metal plate stack 31 which comprises a specified number of metal plates 31a blanked out as shown in FIG. 5 and as already known. Each of the metal plates 31a is in the form of a ring having a plurality of T-shaped projections 31b arranged on the inner periphery of the ring at equal intervals circumferentially thereof and projecting toward the center of the ring. The metal plate 31a has twelve projections 31b according to the present embodiment.

A winding 32 is provided on a stack of projections 31b in phase as a unit.

Such a metal plate stack 31 is made conventionally by blanking out metal plates 31a from a metal sheet material with a blanking die and stacking the plates as blanked out at the same time.

For this reason, burrs created on respective adjacent pairs of blanked-out metal plates 31a, 31a are located at the same position or in alignment.

If burrs are formed on each single blanked-out metal plate 31a uniformly circumferentially thereof, the metal plate stack 31 will have a uniform thickness circumferentially thereof.

However, this is almost unlikely in actuality; when a single blanked-out metal plate 31a is observed, burrs are not positioned uniformly with respect to the circumferential direction. When metal plates 31a which are blanked out in succession are merely stacked in superposed layers, the single metal plate stack 31 will have a difference of about 0.1 to 0.3 mm in thickness and has a portion of large thickness and a portion of small thickness.

For the reason to be given later, there is a need to reduce the likelihood that the metal plate stack 31 will have a portion of large thickness and a portion of small thickness. Accordingly, the stack 31 is divided into units 31c each comprising a number of blanked-out metal plates 31a, and the units 31c are stacked as displaced from one another through a predetermined angle.

According to the present embodiment, the units 31c are stacked as displaced from one another through an angle obtained by dividing 360 deg by the number of units 31c to make the metal plate stack 31. For example, in the case where the number of units 31c is three, the three units 31c are displaced from one another by 120 deg, and a wire is wound around each of the projection stacks 31b to form the winding 32.

The metal plate stack 31 can be made easily by blanking out metal plates 31a from a metal sheet material, stacking a specified number of blanked-out metal plates 31a upon blanking, rotating the metal sheet material through a predetermined angle, e.g., through 120 deg according to the present embodiment, within a horizontal plane every time the specified number of metal plates are blanked out.

Incidentally, the number of inward projections 31b on the metal plate 31b blanked out is limited to a number which can be divided by the number of units 31c.

The rotor 4 is rotatably disposed inside the stator 3 concentrically therewith.

The rotor 4 is made by inserting a rotating shaft 41 through the center of a stack 42 of circular metal plates so as to render the shaft 41 rotatable with the metal plate stack 42.

A plurality of permanent magnets 43 are embedded in the outer peripheral portion of the metal plate stack 42 in parallel to the rotating shaft 41 at equal intervals with S poles and N poles arranged alternately circumferentially of the stack.

The housing 5 for the motor 9 is made by holding the metal plate stack 31 of the stator 3 between a pair of first and second end plates 51, 52 opposed to each other axially of the stator 3 and fastening the two end plates 51, 52 together with a plurality of bolts 53 inserted through the outer peripheral portion of the stack 31 and tightened up.

The metal plate stack 31 of the stator 3 serves the function of fixedly positioning the first end plate 51 and the second end plate 52 as spaced apart by a given distance. Thus, the metal plate stack 31 serves also the function of a cylindrical wall 8 of the motor housing 5 in the conventional hub unit shown in FIG. 9.

The first end plate 51 and the second end plate 52 are provided with respective bearings 58, 58 inside the center portions thereof for the bearings 58, 58 to support opposite ends of the rotating shaft 41 of the rotor 4.

The first end plate 51 and the second end plate 52 are provided at their outer peripheral edges with short inward cylinder portions 54, 55, respectively. The short cylinder portions 54, 55 have at their inner ends respective stepped portions 54a, 55a having fitted therein opposite-end outer peripheral edges of the metal plate stack 31.

The first end plate 51 has a boss 56 on the outer side of the center portion thereof. Extending through the boss 56 is a fixing support shaft 57 projecting outward. The shaft 57 is externally threaded as at 57b.

Provided externally of the second end plate 52 is a reduction mechanism for transmitting the rotation of the rotor 4 to the hub 7 upon a speed reduction.

The reduction mechanism of the present embodiment is a planetary gear reduction mechanism 6.

The reduction mechanism 6 has a planetary gear support frame 61 provided with three tubular legs 62 projecting toward and bearing against the second end plate 52 and equidistantly spaced circumferentially of the frame. The frame 61 is fastened to the second end plate 52 with bolts 63 extending through the respective legs 62.

Extending between and supported by the second end plate 52 and the planetary gear support frame 61 are three support shafts 64 equidistantly spaced circumferentially of the second end plate 52 and each adapted to rotatably support a planetary gear 65 thereon.

The planetary gear 65 comprises a large gear 65a positioned closer to the second end plate 52 and a small gear 65b positioned on the opposite side and coaxial with the gear 65a.

The large gear 65a of the planetary gear 65 is in mesh with a sun gear 60 formed on an end portion of the rotating shaft 41 of the rotor 4. The small gear 65b of the planetary gear 65 is in mesh with inner teeth 66a on the closure plate 72 of the hub 7 to be described later.

The planetary gear support frame 61 has a boss 67 on the inner side of the center portion thereof. Extending through the center of the boss 67 is a fixing support shaft 57a projecting outward. The shaft 57a is externally threaded as at 57b.

The hub 7 comprises a hub main body 71 generally in the form of a cup which is open at the center of its bottom wall and open over the entire area of the other side, and the above-mentioned closure plate 72 covering the entire opening.

The hub main body 71 covers the motor housing 5 and the planetary gear reduction mechanism 6. A bearing 73 is provided in the bottom opening 70 around the boss 56 on the first end plate 51 of the motor housing 5.

The closure plate 72 covers the entire opening of the hub main body 71 so as to conceal the support frame 61 of the reduction mechanism 6 and is fastened to the hub main body 71 with bolts 76.

Fastened with screws to the inner side of the closure plate 72 is an annular member 66 concentric with the fixing support shaft 57. The inner teeth 66a meshable with the planetary gears 65 are formed on the inner periphery of the annular member 66.

The fixing support shaft 57a on the support frame 61 extends through the closure plate 72 to the outside. A bearing 75 is provided in the closure plate 72 around the fixing support shaft 57a.

The hub main body 71 has a circumferential wall 74 formed on its outer peripheral surface and extending therearound at each of opposite side portions. Spoke attaching holes 74a are formed in the circumferential wall 74 and arranged at regular intervals circumferentially of the wall.

With reference to FIG. 2, the rotating shaft 41 of the rotor 4, the fixing support shaft 57 on the first end plate 51 of the motor housing 5, and the fixing support shaft 57a extending through the closure plate 72 of the hub 7 are arranged in alignment.

When both the fixing support shafts 57, 57a are secured to the front fork 12 of the bicycle by screw-thread engagement, the portions marked with lines slanting leftwardly downward in FIG. 2 are fixed portions, and the portions marked with lines slanting rightwardly downward are rotating portions.

When a load in excess of a specified value acts on the bicycle pedals 18 upon the pedals being stepped on, the battery 17 energizes the windings 32 of the stator 3, rotating the rotor 4.

The rotation of the rotor 4 rotates the sun gear 60 on the end of the rotating shaft 41 to rotate the planetary gears 65 in position. The rotation of the planetary gears 65 is transmitted through the inner teeth 66a to the hub 7 on a speed reduction, drivingly rotating the front wheel 11.

By virtue of the rotation of the rotor 4, the bicycle 1 can be run with a reduced stepping force on the pedals 11.

The energization of the windings 32 causes the windings 32 to generate heat, which is given to the stator 3. However, the motor housing 5 does not have a cylindrical wall which prevents radiation of heat, so that the heat given to the stator 3 is released directly through an opening between the pair of end plates 51, 52 holding the stator 3 therebetween, whereby the windings 32 can be prevented from overheating without necessitating the cooling liquid conventionally enclosed in the hub 7.

Because the cylindrical wall 8 of the motor housing 5 can be dispensed with and further because there is no need for time and labor for enclosing the cooling liquid in the hub, the hub unit can be manufactured at a reduced cost. The hub unit can be obtained also with a weight reduction corresponding to the cylindrical wall 8 and the cooling liquid omitted.

The stator 3 can be given an increased outside diameter corresponding to the absence of the cylindrical wall 8, with the result that increased torque is available.

If the metal plate stack 31 of the stator 3 has varying thicknesses circumferentially thereof, the parallelism between the end plates 51, 52 involves errors, which produce a bending force acting on the rotating shaft 41 of the rotor 4 supported by bearings 58, 58 on the opposed end plates 51, 52, giving rise to the problem of causing trouble to the smooth rotation of the rotor 4. For this reason, an inherent problem will arise when the metal plate stack 31 of the stator 3 is held between the pair of end plates 51, 52 and if the end plates 51, 52 are fastened together by tightening up the bolts 53 so as to cause the thrust of screws to act on the stack 31 in the direction of stacking as practiced in the present embodiment.

According to the embodiment, however, a plurality of units 31c each comprising a specified number of metal plates 31a blanked out are stacked as displaced from one another by a predetermined angle so as to render the metal plate stack 31 uniform in thickness circumferentially thereof to the greatest possible extent. Even if the end plates 51, 52 are fastened by tightening up the bolts 53 so as to causes the thrust of screws to act on the metal plate stack 31 in the stacking direction, the first and second end plates 51, 52 can therefore be given parallelism with high accuracy.

Consequently, the rotor 4 can be rotated smoothly by giving improved parallelism to the bearings 58, 58 for supporting the opposite ends of the rotating shaft 41 of the rotor 4.

Figure 6:
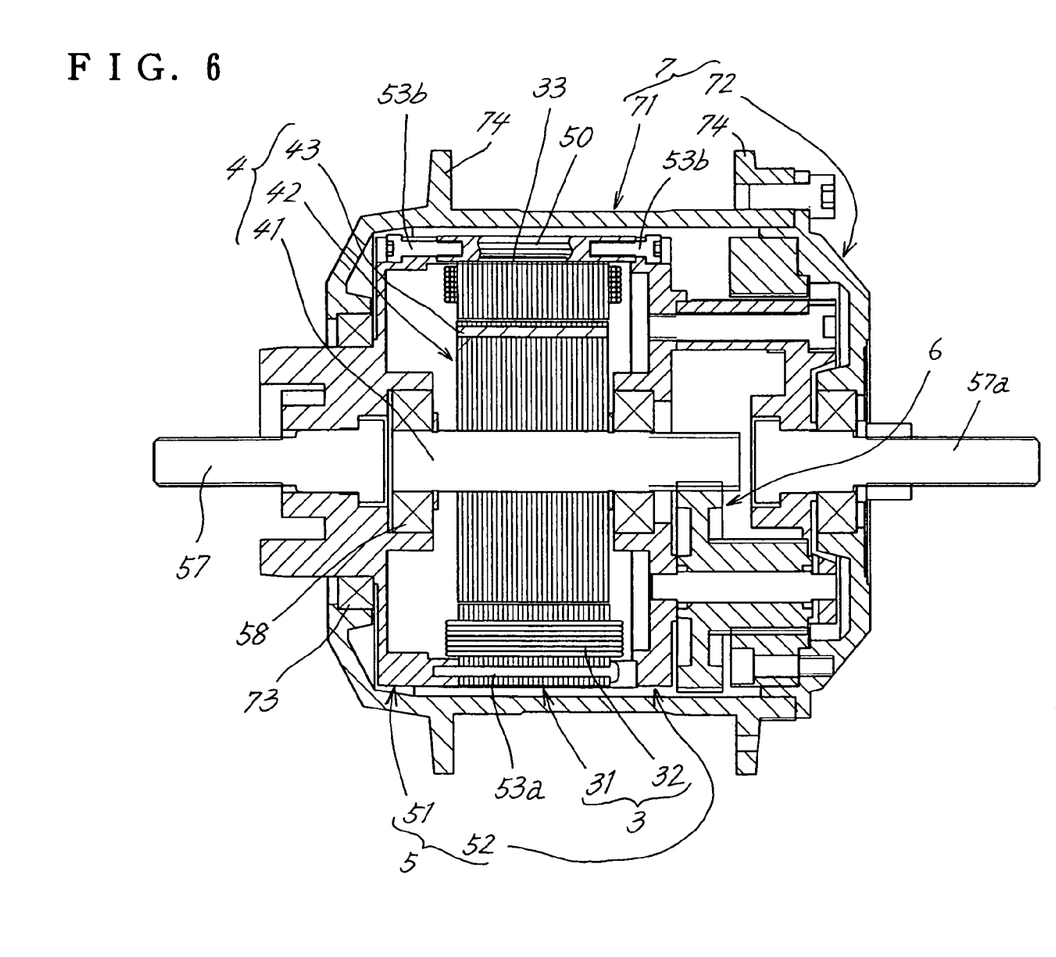
FIG. 6 is a sectional view of a hub unit of second embodiment.
Figure 7:
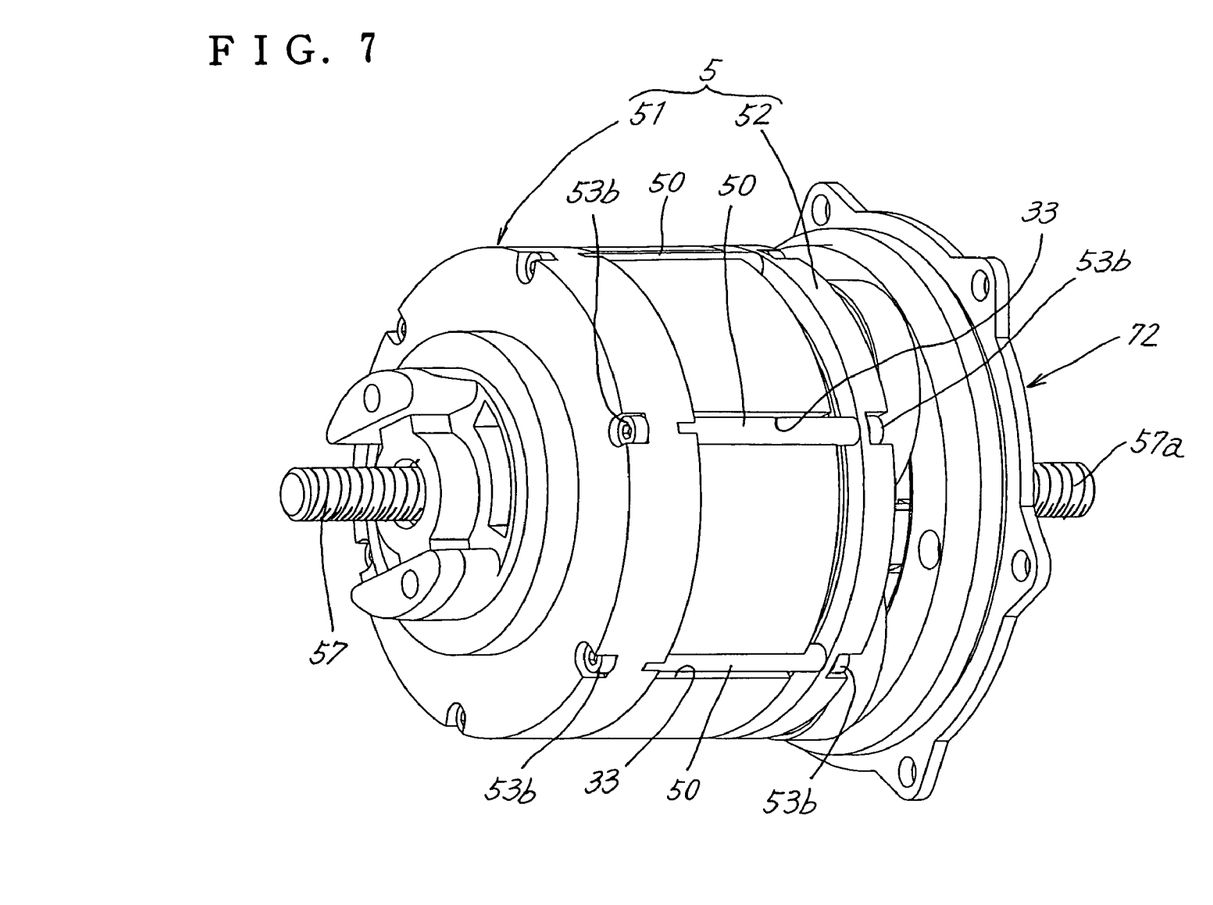
FIG. 7 is a perspective view of the hub unit with a hub main body removed.

FIG. 6 shows a second embodiment of hub unit 2, and FIG. 7 is a perspective view of the same with a hub main body removed.

This embodiment has the same construction as the hub unit 2 shown in FIG. 2 except the motor housing 5 and the means for attaching the metal plate stack 31 of the stator 3 to the motor housing. Accordingly, the same description will not be given repeatedly.

The motor housing 5 comprises a first end plate 51, second end plate 52, a plurality of spacer rods 50 interposed between the two end plates 51, 52 for determining the distance therebetween, and fastening bolts 53b, 53b inserted through the end plate 51 or 52 and screwed into the spacer rods 50.

The spacer rods 50 have a length slightly larger than the thickness of the metal plate stack 31 of the stator 3.

The metal plate stack 31 is provided in its outer peripheral portion with grooves 33 for the respective spacer rods to fit in.

The stack 31 is fastened to the first end plate 51 or the second end plate 52 with bolts 53a extending through the outer peripheral portion of the stack 31.

The metal plate stack 31 does not serve also as a component of the motor housing 5 unlike the stack 31 of the hub unit 2 shown in FIG. 2.

In the case of the embodiment of FIG. 6, therefore, no bending force will act on the rotating shaft 41 of the rotor 4 even if the stack 31 has varying thicknesses circumferentially thereof.

Figure 8:
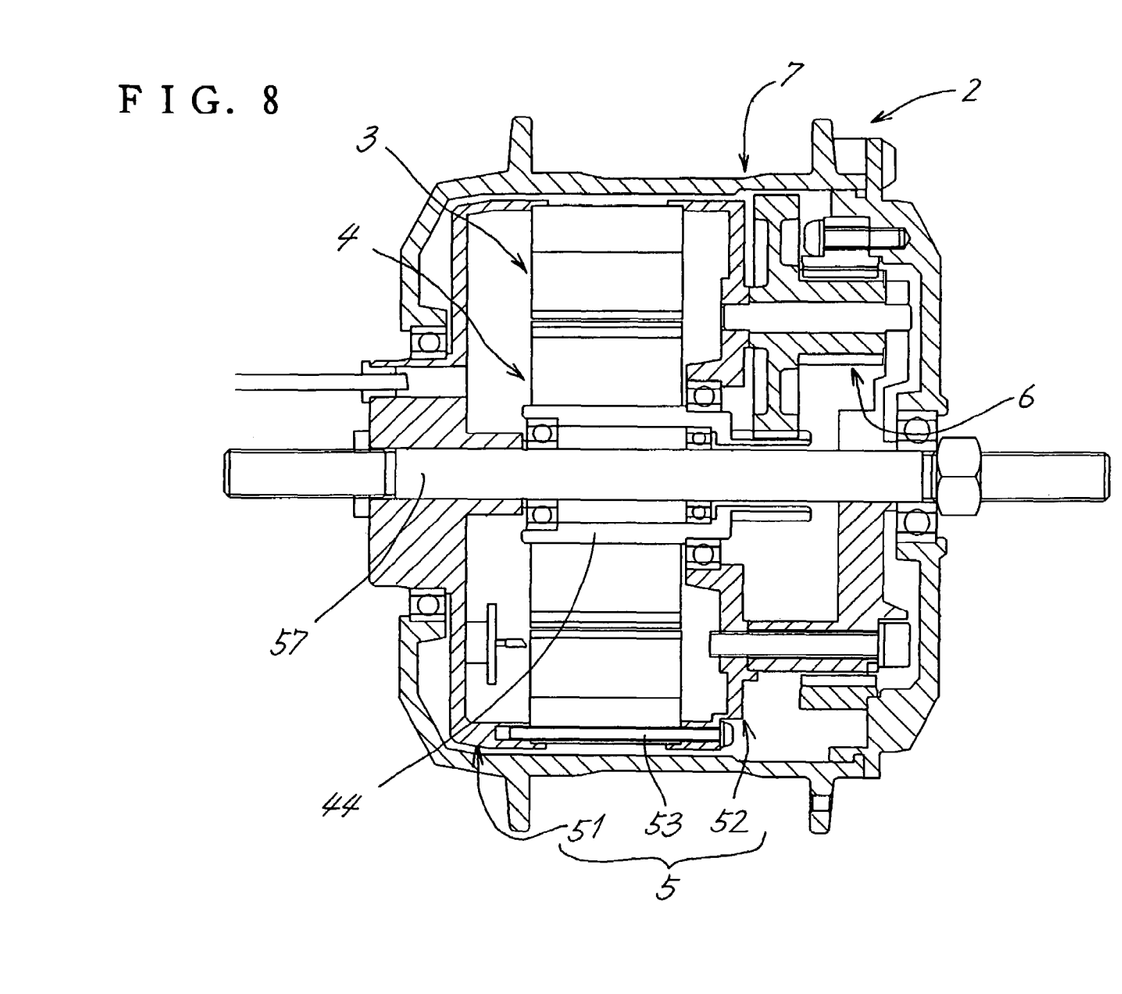
FIG. 8 is a sectional view of a hub unit of third embodiment.

FIG. 8 shows a third embodiment of hub unit 2. This embodiment has the same construction as the hub unit 2 shown in FIG. 2 except that a single fixing support shaft 57 extends through a hub 7 and that a rotor 4 is provided on a tubular shaft 44 rotatably fitting around the support shaft 57.

When the fixing support rods 57, 57a extend through respective opposite ends of the hub 7 to project outward therefrom and are each independent of the rotating shaft 41 of the rotor 4 as in the hub unit 2 shown in FIG. 2, the hub unit has a complex construction. Furthermore, errors involved in machining or assembling the components are likely to cause the deflection of the axes of the support shafts 57, 57a at the opposite ends, whereas the third embodiment can be free of these problems.

The hub unit 2 of the present invention, which is useful for electrically assisted bicycles, can be embodied alternatively for hubs for vehicles having wheels, for example, for wheelchairs.

The individual fixing support shafts 57, 57a of the first and second embodiments described are caused to extend outward from respective opposite ends of the hub 7, and the single fixing support rod 57 of the third embodiment has opposite ends projecting from respective opposite ends of the hub 7, so that the hub unit 2 can be supported at opposite ends, whereas when the hub unit 2 is to be supported at only one end thereof as in wheelchairs, one end of the fixing support shafts is omitted.

Apparently, the present invention can be modified and altered by one skilled in the art without departing from the spirit of the invention, and such modification is included within the scope of the invention as set forth in the appended claims.

What is claimed is:

1. An electrically movable wheel hub unit comprising a motor composed of a stator and a rotor, a hub enclosing the motor therein and rotatingly drivable by the rotation of the rotor, and a fixing support shaft disposed on an axis of rotation of the hub and projecting from the motor housing fixedly relative thereto, the support shaft projecting outward beyond the hub, the stator comprising:

a laminated stator core having a plurality of laminated core units, each of said core units having a predetermined number of stacked non-split annular metal plates blanked out, said stator core is formed by a predetermined number of said core units displaced from one another in the direction of rotation through an angle obtained by dividing 360 degrees by the number of the units, a pair of end plates opposed to each other with the stack of metal plates held therebetween and fastened to each other by tightening up bolts inserted through the stack of metal plates, whereby the end plates are caused to clamp the metal plate stack therebetween, and the stator having an outer peripheral surface left exposed to face an inner surface of the hub between the end plates.

2. The electrically movable wheel hub unit according to claim 1 wherein the hub has enclosed therein a planetary gear mechanism operable by the rotation of the rotor, the hub having inner teeth formed on an inner surface thereof and meshable with planetary gears of the planetary gear mechanism.

3. A vehicle comprising a wheel having incorporated therein an electrically movable wheel hub unit according to claim 1.

4. A vehicle comprising a wheel having incorporated therein an electrically movable wheel hub unit according to claim 2.

* * * * *